(12) United States Patent
McCombs, Jr.

(10) Patent No.: US 6,301,947 B1
(45) Date of Patent: Oct. 16, 2001

(54) FLUID LEVEL INDICATOR THAT COMPENSATES FOR FLUID TEMPERATURE

(75) Inventor: David E. McCombs, Jr., Detroit, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/273,032

(22) Filed: Mar. 19, 1999

(51) Int. Cl.$^7$ ........................................... G01F 23/00
(52) U.S. Cl. ............................................. 72/295; 73/290 R
(58) Field of Search ................................. 73/295, 290 R

(56) References Cited

U.S. PATENT DOCUMENTS

| | | |
|---|---|---|
| 1,374,357 | 4/1921 | Linebarger . |
| 1,515,222 | 11/1924 | Reben . |
| 3,360,990 * | 1/1968 | Greene et al. ........................... 73/295 |
| 3,485,100 * | 12/1969 | Petersen .................................. 73/295 |
| 3,704,625 | 12/1972 | Seto et al. . |
| 4,461,175 * | 7/1984 | Baumgart et al. ..................... 73/295 |
| 4,843,876 * | 7/1989 | Holm ..................................... 73/290 R |
| 5,076,708 | 12/1991 | Pierson . |
| 5,482,373 | 1/1996 | Hutchinson . |
| 6,125,697 * | 11/2000 | Holton et al. .......................... 73/314 |

* cited by examiner

Primary Examiner—Hezron Williams
Assistant Examiner—Katina M Wilson
(74) Attorney, Agent, or Firm—Edwin W. Bacon, Jr.

(57) ABSTRACT

A fluid level indicator that compensates for fluid temperature is provided. The indicator includes an elongated shaft that is received by the fill tube of the apparatus. The shaft is adapted to contact the fluid at one end to measure the level of fluid in the apparatus. A reversible liquid crystal display is carried by the shaft and includes a plurality of bands. Each band has a defined height and is capable of being illuminated when the oil is within a certain temperature spectrum. When the band is at a temperature within its spectrum, the band illuminates, or somehow differentiates itself from those bands that are not within their illumination spectrum. At a specific temperature, certain bands, adjacent to one another, are illuminated to create a vertical range on the dipstick. The desired level of fluid in the apparatus is defined by the vertical range created by the illuminated bands of the liquid crystal display.

2 Claims, 4 Drawing Sheets

FLUID LEVEL INDICATOR THAT COMPENSATES FOR FLUID TEMPERATURE

BACKGROUND OF THE INVENTION

1. Technical Field

The present invention relates in general to fluid level indicators. More particularly, but without restriction to the particular embodiment and/or use which is shown and described for purposes of illustration, the present invention relates to fluid level indicators that compensate for the fluid temperature.

2. Discussion

In a conventional automobile, the fluid level of the transmission and engine needs to be closely monitored. High or low fluid levels could have a detrimental effect on the performance and longevity of the vehicle. Typically, a vehicle will include a number of fluid level indicators, commonly referred to as dipsticks. Each dipstick is disposed so that one end thereof enters a reservoir in either the engine or transmission. A dipstick can easily be removed by its other end and used to measure the level of oil therein. The fluid level of the engine or transmission is indicative of the amount of oil, defined by height, that clings to the dipstick.

Typically, a dipstick has a plurality of marking to set desired operating levels or ranges. In most vehicles, a dipstick will have a high and a low marking. An oil level between the high and low marking is desired for optimal performance of the engine. Unfortunately, the volume of oil and other similar fluids is generally dependent on temperature. As an engine or a transmission is operating, a tremendous amount of heat is produced, some of which is transferred to the oil system. As the temperature of the fluid rises, the level of fluid in the reservoir rises. This causes a traditional fluid level indicator to read a higher value. This leads to a discrepancy of fluid level as read by a dipstick depending on the temperature of the fluid.

Many automotive manufacturers have provided instructions for checking fluid levels via a dipstick. Such instructions have included that oil should only be checked when the vehicle has been inoperable for a certain amount of time, or that oil should only be checked when the vehicle is operating. These conditions are postulated in an attempt to estimate fluid temperature. However, this is not always convenient, and furthermore, it is never truly known what temperature the fluid is at even with the aforementioned instructions.

There is, therefore, a need to provide a fluid level indicator that properly describes the desired fluid level dependent on temperature. There is also a need to provide a fluid level indicator that can be used to obtain an accurate reading independent of the operating state and history of the vehicle.

SUMMARY OF THE INVENTION

Accordingly, it is a principal objective of the present invention to provide a fluid level indicator that compensates for fluid temperature.

It is another objective of the present invention to provide a truly unique fluid level indicator that provides markings that are dependent on fluid temperature.

It is a further objective of the present invention to provide a fluid level indicator that is accurate irrespective of the operating state and history of the vehicle.

In one form, the present invention provides a fluid level indicator that compensates for fluid temperature. The indicator includes an elongated shaft that is received by the fill tube of an apparatus. The shaft is adapted to contact the fluid at one end to measure the level of fluid in the apparatus. A reversible liquid crystal display is carried by the shaft and includes a plurality of bands. Each band has a defined height and is capable of being illuminated when the oil is within a certain temperature spectrum. When the band is at a temperature within its spectrum, the band illuminates, or somehow differentiates itself from those bands that are not within their illumination spectrum. At a specific temperature, certain bands, adjacent to one another, are illuminated to create a vertical range on the dipstick. The desired level of fluid in the transmission is defined by the vertical range created by the illuminated bands of the liquid crystal display.

In another form, the present invention provides a fluid level indicator that compensates for fluid temperature. The indicator includes an elongated shaft that is received by the fill tube of an apparatus. The shaft is adapted to contact the fluid at one end to measure the level of fluid in the apparatus. A reversible liquid crystal display is carried by the shaft and includes a top plurality of bands. Each of the top plurality of bands capable of being illuminated in a specified temperature range to produce a top marking by which to measure the maximum desired level of the fluid. The reversible liquid crystal display also includes a bottom plurality of bands. Each of the bottom plurality of bands capable of being illuminated in a specified temperature range to produce a bottom marking by which to measure the minimum desired level of the fluid at that temperature. The markings of the indicator effectively change with oil temperature.

Additional benefits and advantages of the present invention will become apparent to those skilled in the art to which this invention relates from a reading of the subsequent description of the preferred embodiment and the appended claims, taken in conjunction with the accompanying drawings.

DETAILED DESCRIPTION OF THE PREFERRED EMBODIMENT

Figure 1:
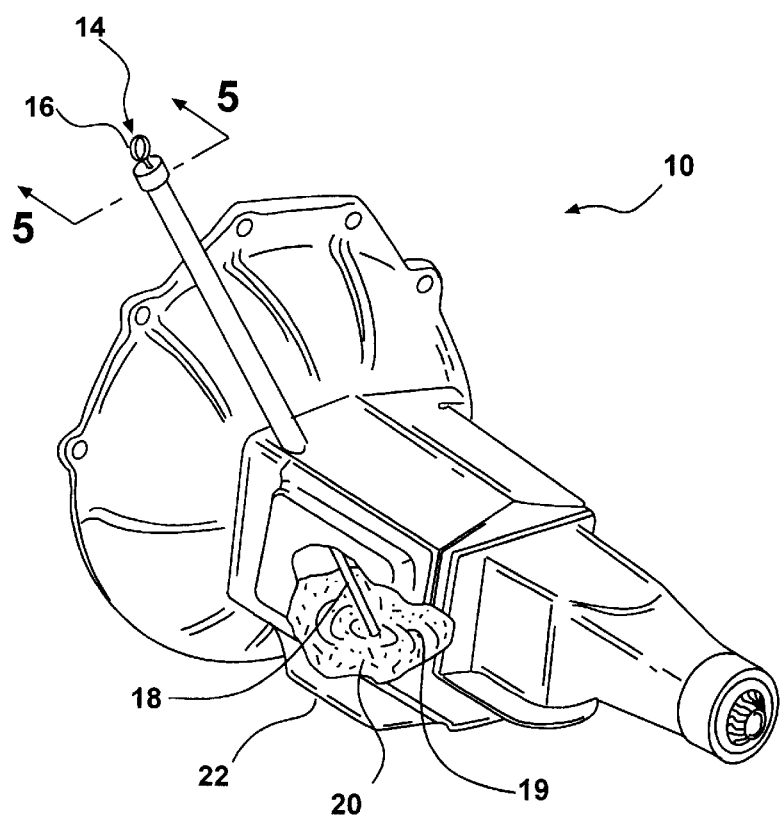
FIG. 1 is a perspective view of an automobile transmission having a fluid level indicator.

Referring now to the drawings, there is depicted a fluid level indicator illustrating the preferred embodiment of the present invention. Turning first to FIG. 1, a transmission 10 is shown. It should be appreciated that the present invention could be employed with an internal combustion engine or any other fluid carrying apparatus. Transmission 10 includes a fill tube 12. Fill tube 12 has a hollow cylindrical shape that extends from the body of transmission 10 to a location that is easily accessible to either the operator of the vehicle or a service technician. A fluid level indicator 14 is adapted to be received by fill tube 12. Indicator 14 includes a handle portion 16 and a thin elongated shaft portion 18. The end 20 of shaft 18 opposite handle portion 16 is disposed such that it enters the oil 19, or other fluid, whose level needs to be monitored. In the preferred embodiment, shaft 18 extends into a reservoir 22 disposed near the bottom of transmission 10. As the temperature of the oil 19 changes, the level of oil 19 in reservoir 22 will also change due to the thermal expansion characteristics of the oil 19.

Figure 2:
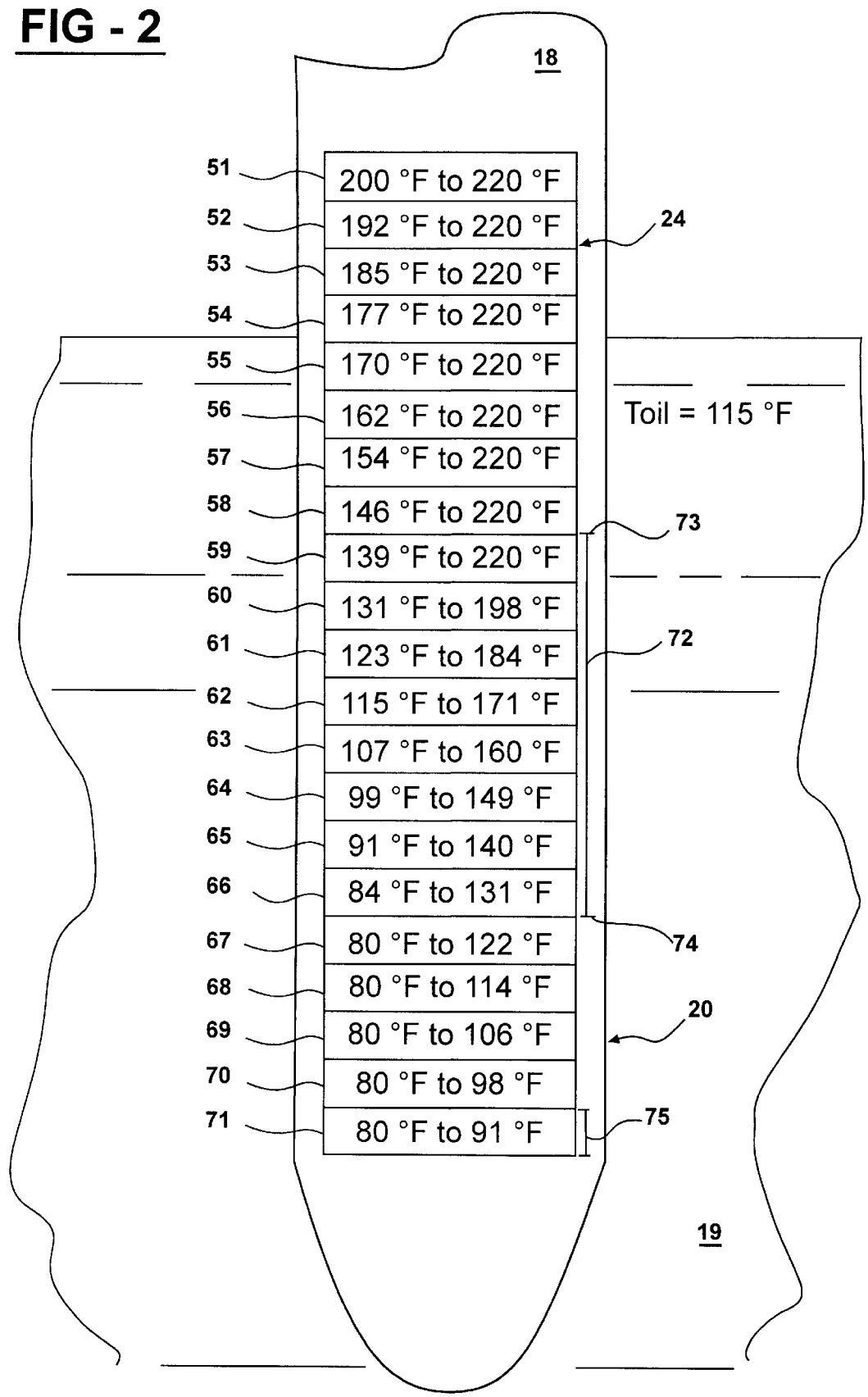
FIG. 2 is a side view of a fluid level indicator of the present invention in a fluid having a first temperature.

Oil 19 clings to end 20 of shaft 18 indicating the height of oil 19 in the reservoir 22. As the temperature of the oil 19 changes the height of oil 19 in the reservoir will change. Every transmission 10, or like apparatus, has a desired range for the amount of oil 19 needed to operate effectively. This range has traditionally been indicated on end 20 of shaft 18 by notches or ticks. Unfortunately, these notches do not effectively account for the thermal expansion of the oil 19. In the preferred embodiment, a reversible liquid crystal display 24 is attached to end 20 of shaft 18, as shown in FIG. 2. One such liquid crystal display 24 is sold commercially by Omega Engineering Inc. Such displays, similar to forehead thermometers and fish tank temperature indicators, have a band that lights up when a certain temperature is achieved.

Liquid crystal display 24 is in thermal contact with shaft 18 and shaft 18 is in thermal contact with oil 19. Due to general principles of heat transfer, the liquid crystal display 24 will be at essentially the same temperature as the oil 19. The liquid crystal display 24 includes a plurality of bands 51, 52, 53, 54, 55, 56, 57, 58, 59, 60, 61, 62, 63, 64, 65, 66, 67, 68, 69, 70, and 71. Each band has a defined vertical height, exemplified by height 75 of band 71. Each band also includes an associated illumination temperature spectrum, as indicated in the Figures. When the surrounding temperature is within the spectrum of a specific band, that band will differentiate itself from other bands whose illumination spectrum does not encompass the surrounding temperature. In the Figures, all bands that are not illuminated are illustrated with shading. A band illuminates in the present invention when the surrounding temperature is within its illumination spectrum, it should be appreciated that any differentiation from the other bands, not necessarily illumination, is within the scope of the present invention. For example, the oil 19 temperature in FIG. 2 is 115° F., which causes a group of bands 62, 63, 64, 65, 66, and 67 to illuminate. This group of bands creates a vertical range 72 that is consistent with the desired range of the oil 19 level in the transmission 10 at 115° F. Vertical range 72 is utilized in measuring the level of the oil 19. End 73 of vertical range 72 defines the maximum desired oil 19 fill and end 74 defines the minimum desired oil 19 fill.

Figure 3:
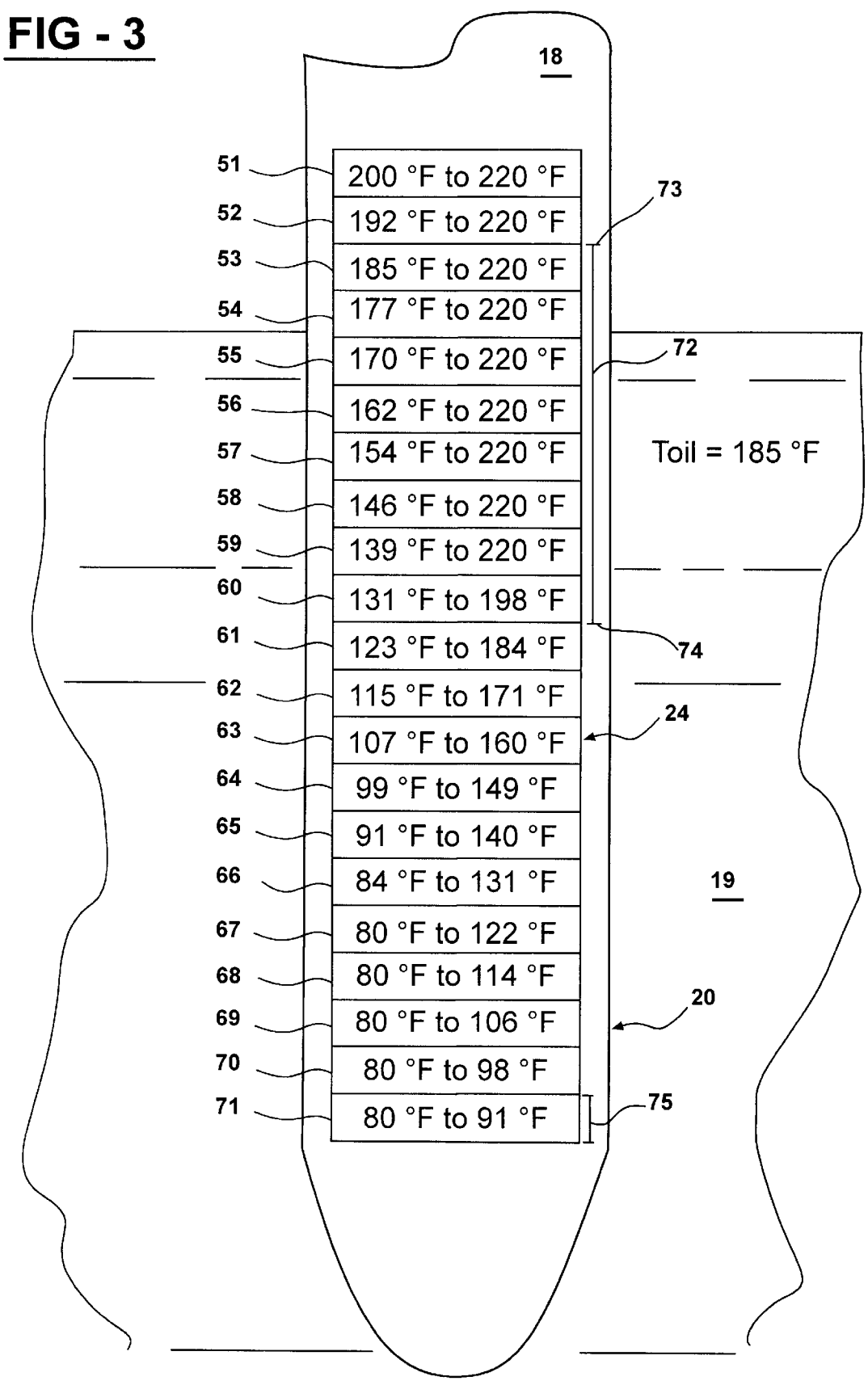
FIG. 3 is a side view of a fluid level indicator of the present invention in a fluid having a second temperature, the second temperature being higher than the first temperature of FIG. 3.

As the temperature of the oil 19 increases, thermal expansion causes the level of oil 19 to rise therewith. In reference to the temperature rise between FIG. 2 and FIG. 3, as the temperature increases past 122° F., band 67 is no longer illuminated because the surrounding temperature is not within the temperature spectrum of band 67. On the other end of vertical range 72, at a temperature of 123° F. band 61 illuminates. It should be appreciated that as the temperature of the oil 19 increases the vertical range 72 rises vertically along shaft 18. FIG. 3 illustrates the present invention while the oil is at 185° F. It should be appreciated that only the bands that include 185° F. within their temperature spectrum are differentiated from the other bands by a change in appearance. Bands 53, 54, 55, 56, 57, 58, 59, and 60 are illuminated at 185° F. while bands 51 and 52 are not illuminated because 185° F. is below their spectrum and bands 61, 62, 63, 64, 65, 66, 67, 68, 69, 70, and 71 are not illuminate because 185° F. is above their temperature spectrum. It should further be appreciated the temperature spectrum of each band overlaps somewhat with vertically adjacent bands. This is adopted to create the desired vertical range for measuring the height of the oil 19. Furthermore, the overlapping and with of the temperature spectrums for the bands can be used to design broader vertical ranges 72 at some temperatures while allowing narrow vertical ranges at other temperatures depending on the application. The nature of a present band within a liquid crystal display 24 is such that the degree of illumination depends upon the region within the temperature spectrum of the band. While in various regions of the temperature spectrum, the illumination may be a different color or of a different degree than while at other regions within the spectrum. In any event, in all regions of a band's temperature spectrum, the band is sufficiently differentiated from those bands that are not at a temperature within their spectrum to act as a marking.

Figure 4:
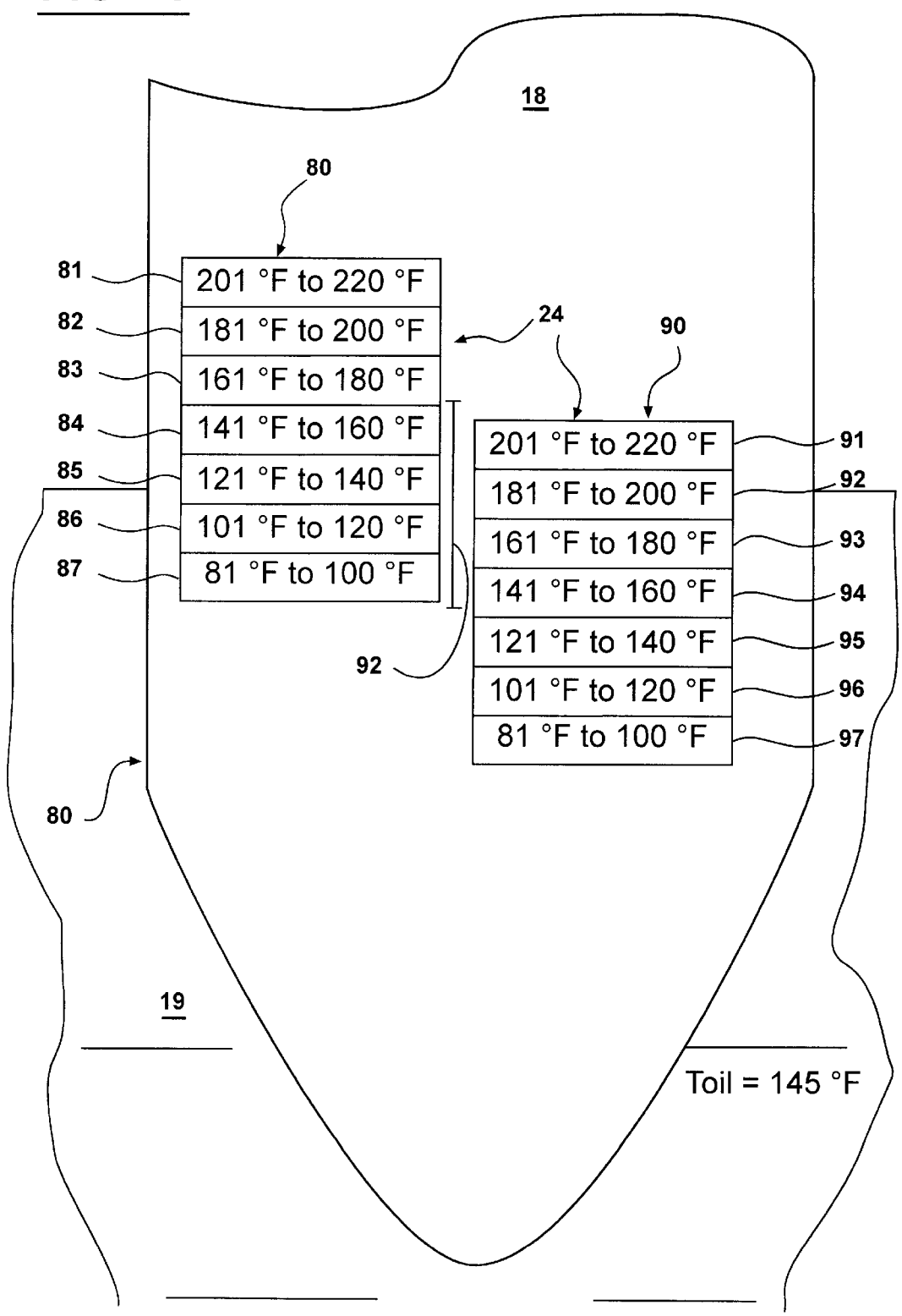
FIG. 4 is a side view of an alternate embodiment of a fluid level indicator of the present invention.

FIG. 4 shows an alternate embodiment of the present invention. Liquid crystal display 24 includes a top plurality of bands 80 including bands 81, 82, 83, 84, 85, 86, and 87, only one of which would be illuminated at a time. The exact band being illuminated is dependent upon the temperature of the oil 19. In FIG. 4, the oil 19 temperature is 145° F. and band 84 is illuminated in response thereto creating a top marking. It should be appreciated that there is no overlap between the temperature spectrum of adjacent bands in this alternate embodiment. The illuminated band 84 in the top marking establishes the maximum fill of oil 19 desired. As the temperature rises, the illuminated band will change accordingly. The liquid crystal display 24 also include a bottom plurality of bands 90 that includes bands 91, 92, 93, 94, 95, 96, and 97, only one of which would be illuminated at a time. The exact band being illuminated is dependent upon the temperature of the oil 19. At 145° F. band 94 is illuminated. This illuminated band 94 creates a bottom marking to establish the minimum desired level of oil 19. This creates a marking system of maximums and minimums that effectively compensates for the thermal expansion of oil 19. The top illuminated band 84 establishes the maximum fill of oil 19 desired and the bottom illuminated band 94 establishes the minimum fill of oil 19 desired. It should be appreciated that the bottom plurality of bands 90 is disposed lower on shaft 18 than the top plurality of bands 80 in order to define a range 92 between the top illuminated band 84 and the bottom illuminated band 94 for measuring the level of the oil 19.

The present invention also provides the designer of fluid level indicators great flexibility when measuring the level of oil 19 in the reservoir 22. The indicator may have a wider span between the top illuminated band and the bottom illuminated band when the transmission oil 19 is hot than when the oil 19 is cold, if desired. It should also be appreciated that the preferred liquid crystal display 24 is reversible so that the display 24 always reads the current temperature of the shaft 18 and the oil 19.

Figure 5:
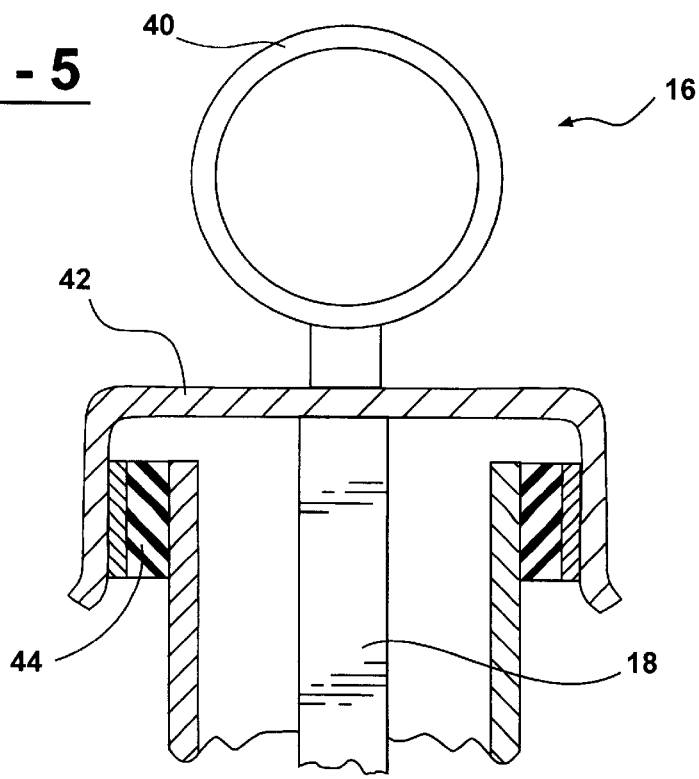
FIG. 5 is a cross sectional view along the line 5—5 of FIG. 1.

FIG. 5 illustrates a cross sectional view of the handle portion 16. Handle portion 16 includes a handle 40 and a cap portion 42. Disposed around the circumference of the cap portion 42 is a thermal isolator 44. Isolator 44 is adapted to ensure the only conductive thermal contact with shaft 18 is from the oil 19.

While the above description constitutes the preferred embodiment of the invention, it will be appreciated that the invention is susceptible to modification, variation, and change without departing from the proper scope or fair meaning of the accompanying claims.

What is claimed is:

1. A fluid level indicator for measuring the level of a fluid, said fluid level indicator comprising:

a shaft with one end adapted to contact the fluid; and a display having a plurality of bands carried by said shaft, each of said plurality of bands is capable of being differentiated when in a specified temperature spectrum to produce a marking by which to measure the level of the fluid, wherein said plurality of bands are disposed vertically from one another, each of said plurality of bands having a defined vertical height, and said specified temperature spectrum of each band overlaps with the specified temperature spectrum of a vertically adjacent band.

2. The fluid level indicator as set forth in claim 1, wherein more than one vertically adjacent bands are differentiated at a specified temperature, said adjacent differentiated bands form a vertical range defining the desired vertical range of fluid level, said vertical range capable of translating vertically dependent upon the temperature of the fluid.

* * * * *